(12) United States Patent
Lee et al.

(10) Patent No.: US 9,316,864 B2
(45) Date of Patent: Apr. 19, 2016

(54) LIQUID CRYSTAL DISPLAY DEVICE

(71) Applicant: LG Display Co., Ltd., Seoul (KR)

(72) Inventors: Jun-Jae Lee, Paju-si (KR); Su-Young An, Goyang-si (KR); Chin-Il Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 46 days.

(21) Appl. No.: 14/075,312

(22) Filed: Nov. 8, 2013

(65) Prior Publication Data
US 2014/0176869 A1 Jun. 26, 2014

(30) Foreign Application Priority Data

Dec. 24, 2012 (KR) .......................... 10-2012-0151797
Sep. 26, 2013 (KR) .......................... 10-2013-0114455

(51) Int. Cl.
*G02F 1/1335* (2006.01)
*F21V 8/00* (2006.01)
*G02F 1/1333* (2006.01)

(52) U.S. Cl.
CPC ........ *G02F 1/133615* (2013.01); *G02B 6/0093* (2013.01); *G02B 6/009* (2013.01); *G02B 6/0088* (2013.01); *G02F 2001/133317* (2013.01); *G02F 2001/133322* (2013.01); *G02F 2201/503* (2013.01)

(58) Field of Classification Search
None
See application file for complete search history.

(56) References Cited

U.S. PATENT DOCUMENTS

| | | | |
|---|---|---|---|
| 2007/0064378 A1* | 3/2007 | Lo ..................... | G02F 1/133308 361/679.22 |
| 2009/0237584 A1* | 9/2009 | Kim ................................. | 349/58 |
| 2011/0096569 A1* | 4/2011 | Hamada ......................... | 362/613 |
| 2012/0250354 A1* | 10/2012 | Yoshida ......................... | 362/613 |
| 2013/0308074 A1* | 11/2013 | Park et al. ......................... | 349/58 |

FOREIGN PATENT DOCUMENTS

| | | |
|---|---|---|
| CN | 101539684 A | 9/2009 |
| JP | 2012-156079 A | 8/2012 |
| JP | 2012-208254 A | 10/2012 |
| JP | 2012-237826 A | 12/2012 |
| WO | WO 2010/064501 A1 | 6/2010 |
| WO | WO 2012/133312 A1 | 10/2012 |

OTHER PUBLICATIONS

Japan Patent Office, Office Action, Japan Patent Application No. 2013-229099, Jul. 15, 2014, eleven pages.
State Intellectual Property Office of the People's Republic of China, First Office Action, Chinese Patent Application No. 201310627963.X, Dec. 30, 2015, fourteen pages.

\* cited by examiner

*Primary Examiner* — Richard Kim
(74) *Attorney, Agent, or Firm* — Fenwick & West LLP

(57) ABSTRACT

An LCD device includes a liquid crystal panel; a backlight unit disposed at a rear side of the liquid crystal panel and including an LED assembly and a light guide plate, wherein the light guide plate has a first surface facing the LED assembly and a second surface opposite to the first surface; a cover bottom including a horizontal plane over which the backlight unit is disposed and a side perpendicular to the horizontal plane; a guide panel including a side wall and a horizontal portion, wherein the side wall has a first vertical portion surrounding an outer surface of the side of the cover bottom, and the horizontal portion is vertically bent from the first vertical portion and supports the liquid crystal panel, wherein at least one elastic stopper is formed at the side wall and contacts the second surface.

13 Claims, 11 Drawing Sheets

LIQUID CRYSTAL DISPLAY DEVICE

The application claims the benefit of Korean Patent Application No. 10-2012-0151797 filed in Korea on Dec. 24, 2012 and Korean Patent Application No. 10-2013-0114455 filed in Korea on Sep. 26, 2013, each of which is hereby incorporated by reference for all purposes as if fully set forth herein.

BACKGROUND

1. Field of the Disclosure

The disclosure relates to a liquid crystal display device, and more particularly, to a liquid crystal display device having a narrow bezel and an increase in brightness and image qualities.

2. Discussion of the Related Art

Liquid crystal display (LCD) devices are most widely used for monitors of notebook computers, monitors of personal computers and televisions due to excellent moving images and high contrast ratio. LCD devices use the optical anisotropy and polarization properties of liquid crystal molecules of a liquid crystal layer to produce an image.

An LCD device includes two substrates spaced apart from and facing each other and a liquid crystal layer interposed between the two substrates. The alignment direction of the liquid crystal molecules is controlled by varying the intensity of an electric field applied to the liquid crystal layer, and the transmittance of light through the liquid crystal layer is changed.

The LCD devices require an additional light source because the LCD devices are not self-luminescent. Therefore, a backlight unit is disposed at a rear side of a liquid crystal (LC) panel and emits light into the LC panel, whereby discernible images can be displayed.

Backlight units include cold cathode fluorescent lamps (CCFLs), external electrode fluorescent lamps (EEFLs), and light emitting diodes (LEDs) as a light source. Among these, LEDs have been widely used due to their small sizes, low power consumption, and high reliability.

Backlight units are in general classified as edge type or direct type according to the position of the light source with respect to a display panel. In edge-type backlight units, one or a pair of lamps are disposed at one side or at each of two sides of a light guide plate of a backlight unit. In direct-type backlight units, a plurality of lamps is disposed directly under the display panel.

The direct-type backlight units have restrictions on decreasing a thickness of an LCD device, and the direct-type backlight units are widely used for LCD devices that focus on brightness rather than a thickness of a screen. The edge-type backlight units can have lighter weights and thinner thicknesses than the direct-type, and the edge-type backlight units are widely used for LCD devices that focus on thicknesses such as monitors of notebook computers or personal computers.

FIG. 1 is a cross-sectional view of illustrating an LCD device including an edge-type backlight unit using LEDs as a light source according to the related art.

In FIG. 1, the related art LCD device includes a liquid crystal panel 10, an edge-type backlight unit 20, a guide panel 30, a top cover 40 and a cover bottom 50.

The liquid crystal panel 10 displays images and includes first and second substrates 12 and 14 facing and attached to each other with a liquid crystal layer (not shown) interposed therebetween.

Polarizers 19a and 19b are attached at front and rear surfaces of the liquid crystal panel 10, respectively, and control the polarization of light.

The backlight unit 20 is disposed at a rear side of the liquid crystal panel 10. The backlight unit 20 includes an LED assembly 29, a reflection sheet 25, a light guide plate 23 and a plurality of optical sheets 21. The LED assembly 29 is disposed at an edge of at least one side of the guide panel 30 along a length direction of the guide panel 30, and includes LEDs 29a and a printed circuit board (PCB) 29b on which the LEDs 29a are mounted. The reflection sheet 25 is disposed over the cover bottom 50 and is white- or silver-colored. The light guide plate 23 is disposed over the reflection sheet 25. The plurality of optical sheets 21 is disposed over the light guide plate 23.

Edges of the liquid crystal panel 10 and the backlight unit 20 are surrounded by the guide panel 30 having a rectangular frame shape. The top cover 40 covers edges of a front surface of the liquid crystal panel 10, and the cover bottom 50 covers a rear surface of the backlight unit 20. The top cover 40 and the cover bottom 50 are combined with the guide panel 30 to thereby constitute one-united body.

Various optical designs are considered to provide a surface light source from the backlight unit 20 of the LCD device to the liquid crystal panel 10. Among these, maintaining an optical gap A between the light guide plate 23 and the LED assembly 29 is a significant factor.

However, when an LCD device having light weight, slim thickness and narrow bezel, which is recently required, is embodied, light leakage may occur because additional elements for preventing movement of the light guide plate 23 are near by an active area where an image is displayed. To prevent the light leakage, the additional elements may be removed, and in this case, it is difficult to maintain the optical gap A between the light guide plate 23 and the LED assembly 29.

Thus, it is not easy to provide high surface light source to the liquid crystal panel 10. In particular, there may occur light leakage between the light guide plate 23 and the LED assembly 29 or the LED assembly may be damaged by movement of the light guide plate 23.

Therefore, problems of lowering qualities of the LCD device such as decreases in brightness and image qualities are caused.

SUMMARY

Accordingly, the present invention is directed to a liquid crystal display device that substantially obviates one or more of the problems due to limitations and disadvantages of the related art.

An advantage of the present invention is to provide a liquid crystal display device that prevents a light guide plate from being moved and light from being leaked.

Another advantage of the present invention is to provide a liquid crystal display device having improvement in brightness and image qualities.

Another advantage of the present invention is to provide a liquid crystal display device having light weight, slim thickness and narrow bezel.

To achieve these and other advantages and in accordance with the purpose of embodiments of the invention, as embodied and broadly described,

DETAILED DESCRIPTION OF THE PREFERRED EMBODIMENTS

Reference will now be made in detail to embodiments of the present invention, examples of which are illustrated in the accompanying drawings.

Figure 2:
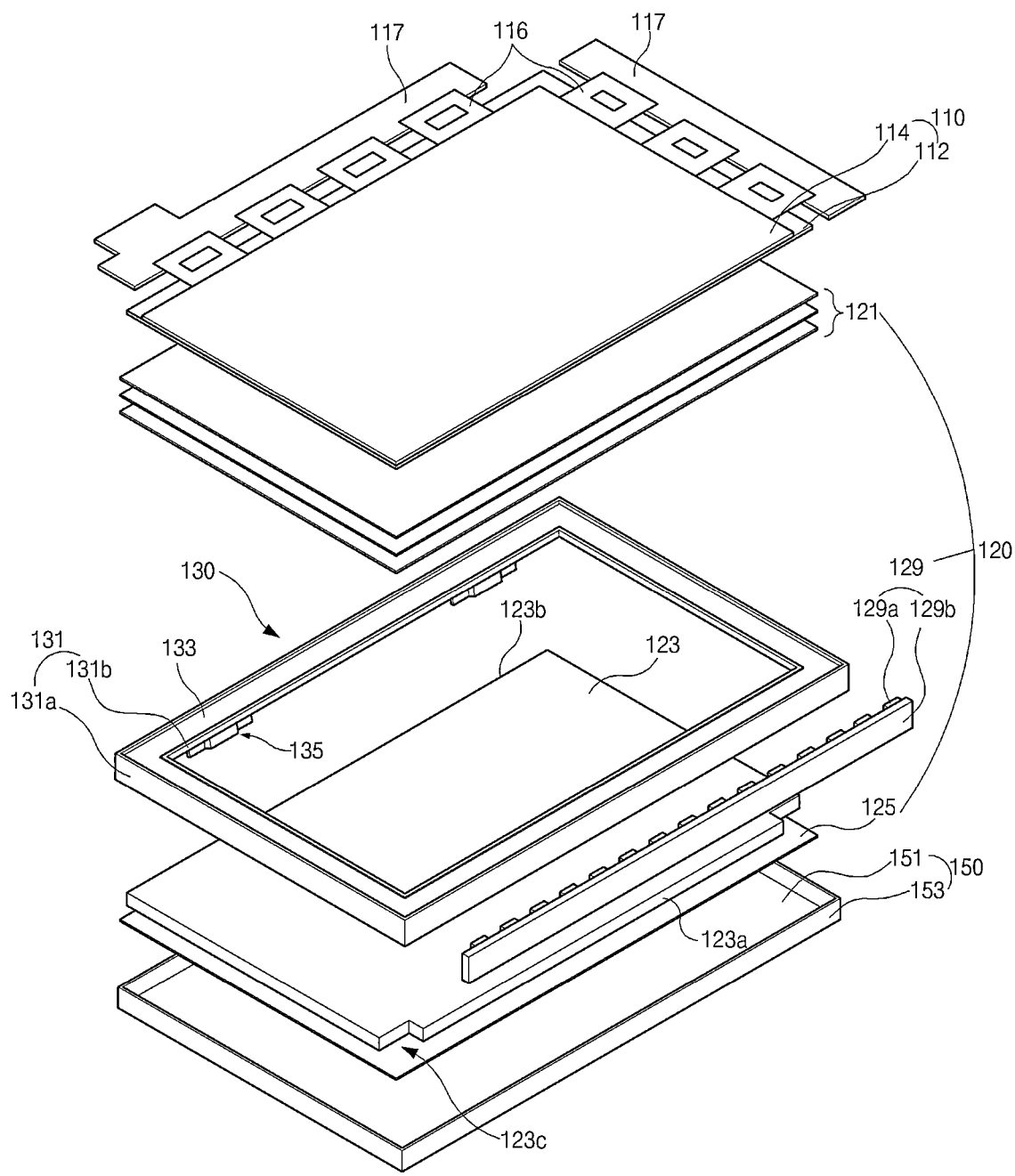
FIG. 2 is an exploded perspective view of an LCD device according to an embodiment of the present invention.

FIG. 2 is an exploded perspective view of an LCD device according to an embodiment of the present invention.

In FIG. 2, an LCD device includes a liquid crystal panel 110 and a backlight unit 120 that lie one upon another and further includes a guide panel 130 and a cover bottom 150 to unite the liquid crystal panel 110 and the backlight unit 120.

Here, when a display surface of the liquid crystal panel 110 faces the front, the backlight unit 120 is disposed at the rear of the liquid crystal panel 110, the guide panel 130 having a rectangle frame shape surrounds the edges of the liquid crystal panel 110 and the backlight unit 120, and the cover bottom 150 closely disposed at the rear surface of the backlight unit 120 is united with the guide panel 130 to thereby form one-united body.

More particularly, the liquid crystal panel 110 displays images. The liquid crystal panel 110 includes first and second substrates 112 and 114 facing and attached to each other with a liquid crystal layer interposed there between. In an active matrix-type, although not shown in the figure, gate lines and data lines are formed on an inner surface of the first substrate 112, which may be referred to as a lower substrate or an array substrate. The gate lines and the data lines cross each other to define pixel regions. A thin film transistor (TFT) is formed at each crossing point of the gate and data lines, and a pixel electrode is connected to the thin film transistor at each pixel region. The pixel electrode may be formed of a transparent conductive material.

A black matrix and red, green and blue color filter patterns are formed on an inner surface of the second substrate 114, which may be referred to as an upper substrate or a color filter substrate. The color filter patterns correspond to the pixel regions, respectively. The black matrix surrounds each of the color filter patterns and covers the gate lines, the data lines, and the thin film transistors. A transparent common electrode is formed over the color filter patterns and the black matrix.

Polarizers (not shown) are attached to outer surfaces of the first and second substrates 112 and 114 and selectively transmit linearly polarized light.

A printed circuit board 117 is attached to at least a side of the liquid crystal panel 110 via connecting means 116 such as flexible printed circuit boards or tape carrier packages (TCPs). The printed circuit board 117 is bent toward a side surface of the guide panel 130 or a rear surface of the cover bottom 150 during a module assembly process.

In the liquid crystal panel 110, on/off signals from gate driving circuits are provided to the thin film transistors through the gate lines, and when the thin film transistors selected by each gate line turn on, data signals from data driving circuits are provided to the pixel electrodes through the data lines. According to this signal voltage, an electric field is induced between the pixel electrodes and the common electrode, and the arrangement of the liquid crystal molecules is changed by the electric field to thereby change transmittance of light. Therefore, the liquid crystal panel 110 displays variances in the transmittance as images.

The backlight unit 120 is disposed under the liquid crystal panel 110 and provides light to the liquid crystal panel 110 so that the variances in the transmittance of the liquid crystal panel 110 are shown to the outside.

The backlight unit 120 includes a light-emitting diode (LED) assembly 129, a reflection sheet 125 of a white or silver color, a light guide plate 123 over the reflection sheet 125, and optical sheets 121 over the light guide plate 123.

The LED assembly 129, as a light source of the backlight unit 120, is disposed at a side of the light guide plate 123 such that the LED assembly 129 faces a side surface 123a of the light guide plate 123, which light is incident on and is referred to as a light-incident surface hereinafter. The LED assembly 129 includes a plurality of LEDs 129a and a printed circuit board (PCB) 129b on which the LEDs 129a are mounted to be spaced apart from each other.

The LEDs 129a include red (R), green (G) and blue (B) LEDs respectively emitting red, green and blue light toward the light-incident surface 123a of the light guide plate 123. White light is produced by lighting the RGB LEDs 129a up at a time and by mixing the red, green and blue light.

Alternatively, to increase luminous efficiency and brightness, the LEDs 129a may include a blue LED chip and use cerium-doped yttrium aluminum garnet (YAG:Ce) as a fluorescent substance. That is, the LEDs 129a may be a blue LED with a yellow fluorescent substance. When passing through the fluorescent, blue light emitted from the blue LED chip of the LEDs 129a is mixed with yellow light from the fluorescent, thereby producing white light.

The light guide plate 123 totally reflects light emitted from the LEDs 129a several times such that the light moves through the inside of the light guide plate 123 and are uniformly scattered. Accordingly, an initial surface light source is provided to the liquid crystal panel 110.

The light guide plate 123 has high transparency, weatherability, and colorability, and the light guide plate 123 induces light to diffuse when the light passes through it.

The light guide plate 123 may be formed of a plastic material such as polymethylmethacrylate (PMMA), which is one of penetrability materials and a transparent acrylic resin, or polycarbonate (PC). PMMA has been most widely used for the light guide plate 123 because of its excellent characteristics of transparency, weatherability, and colorability.

To provide a uniform surface light source, the light guide plate 123 may include predetermined patterns at its rear surface. Here, to guide the light incident on the inside of the light guide plate 123, the patterns may be elliptical patterns, polygonal patterns or hologram patterns. The patterns may be formed by a printing method or an injecting method.

Guide grooves 123c are formed at both sides of the light-incident surface 123a of the light guide plate 123 by removing corners of the light guide plate 123.

Figure 4A:
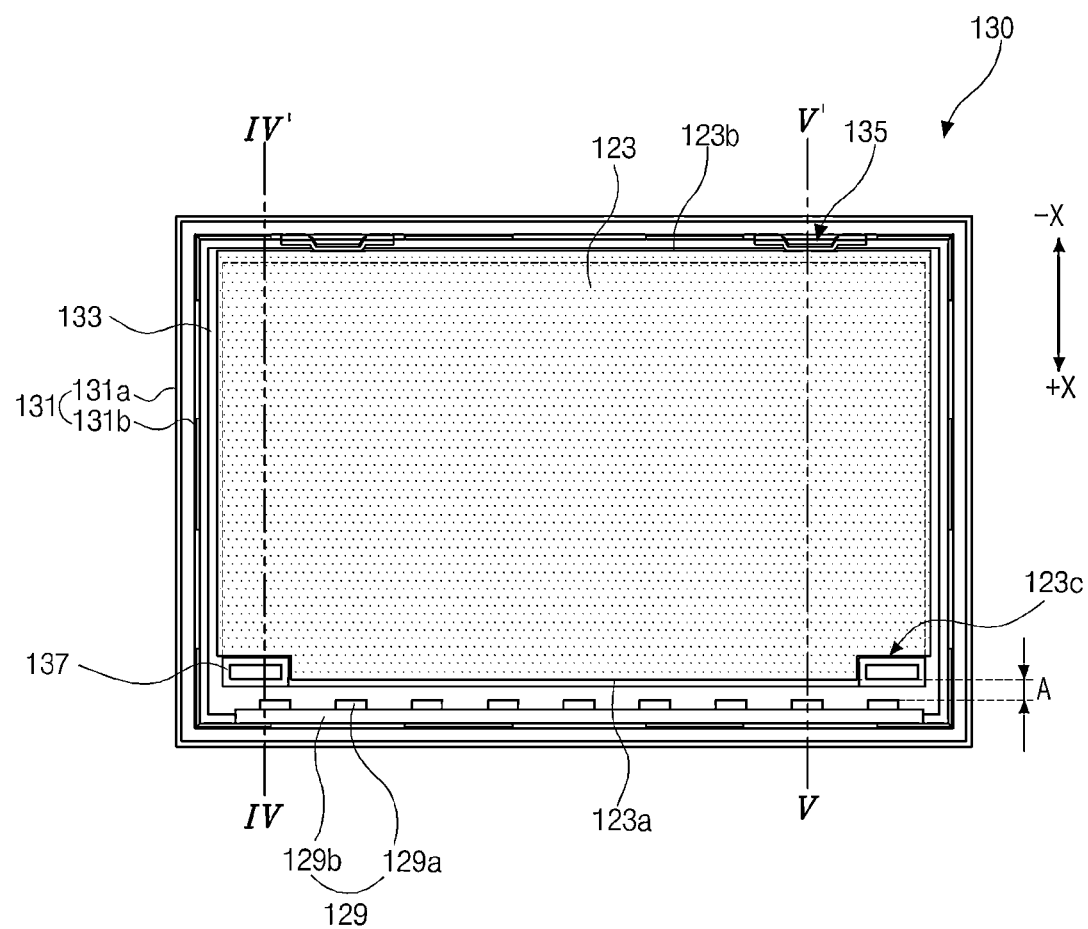
FIG. 4A is a plan view of a guide panel and a light guide plate according to an embodiment of the present invention.

An optical gap A between the light-incident surface 123a of the light guide plate 123 and the LED assembly 129, referring to FIG. 4A, is maintained due to the guide grooves 123c. This will be described in more detail later.

The reflection sheet 125 is disposed under the rear surface of the light guide plate 123. The reflection sheet 125 reflects light passing through the rear surface of the light guide plate 123 toward the liquid crystal panel 110 to increase the brightness.

The optical sheets 121 over the light guide plate 123 include a diffuser sheet and at least a light-concentrating sheet. The optical sheets 121 diffuse or concentrate light passing through the light guide plate 123 such that more uniform surface light source is provided to the liquid crystal panel 110.

The liquid crystal panel 110 and the backlight unit 120 are modularized with the guide panel 130 and the cover bottom 150. The cover bottom 150 has a horizontal plane 151 over which the liquid crystal panel 110 and the backlight unit 120 are disposed, and the cover bottom 150 supports the whole LCD device and minimizes loss of light. The four edges of the horizontal plane 151 of the cover bottom 150 are bent perpendicularly toward the liquid crystal panel 110 and become sides 153.

The guide panel 130 has a rectangular frame shape. The guide panel 130 is disposed over the cover bottom 150 and surrounds edges of the liquid crystal panel 110 and the backlight unit 120. The guide panel 130 is combined with the cover bottom 150.

Here, the guide panel 130 includes side walls 131 and horizontal portions 133. The side walls 131 surround side surfaces of the backlight unit 120. The horizontal portions 133 separate positions of the liquid crystal panel 110 and the backlight unit 120 at the inner surface of the side walls 131. The liquid crystal panel 110 is attached and fixed onto the horizontal portions 133 by adhesive pad 118 of FIG. 5A such as a double-sided tape.

Therefore, the liquid crystal panel 110 and the backlight unit 120 are modularized to form a one-united body.

The LCD device according to the present invention has light weight and slim thickness and also has a narrow bezel because its display area is formed as wide as possible and its non-display area, that is, a bezel area is formed as narrow as possible.

At this time, the side walls 131 of the guide panel 130 partly have a double structure. At least one elastic stopper 135 is formed at a part of the side walls 131 having the double structure to prevent movement of the light guide plate 123. For example, two stoppers 135 may be formed at one of the side walls 131.

Accordingly, in the LCD device according to the present invention, the light guide plate 123 is doubly prevented from moving, and at the same time, the guide panel 130 is prevented from hanging down due to the weight of the liquid crystal panel 110 installed on the horizontal portions 133 of the guide panel 130.

From this, the optical gap A between the light-incident surface 123a of the light guide plate 123 and the LED assembly 129 for providing a surface light source of high quality to the liquid crystal panel 110, referring to FIG. 4A, can be maintained, and the brightness and the image quality of the LCD device can be improved.

In addition, since it is not necessary to form additional elements for preventing movement of the light guide plate 123, the light leakage due to the additional elements close to the active area can be prevented.

Moreover, movement of the light guide plate 123 can be also prevented, and thus it is also prevented that damages of the LEDs 129a of the LED assembly 129 are caused and the image quality is lowered because the optical properties of the LCD device are changed.

Here, the guide panel 130 may be referred to as a support main, a main support or a mold frame, and the cover bottom 150 may be referred to as a bottom cover or a lower cover.

Figure 1:
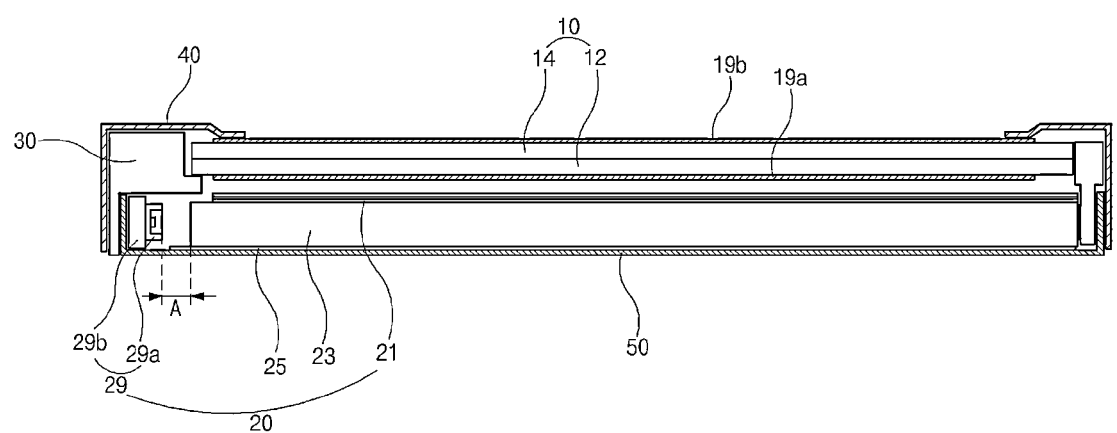
FIG. 1 is a cross-sectional view of an LCD device including an edge-type backlight unit using LEDs as a light source according to the related art.

The LCD device according to the embodiment of the present invention does not include a top cover 40 of FIG. 1. Therefore, the LCD device has light weight, slim thickness and narrow bezel, and manufacturing processes are simplified.

Furthermore, manufacturing costs are decreased due to omission of the top cover 40 of FIG. 1.

The above-mentioned LCD device according to the embodiment of the present invention has a structure of doubly preventing movement of the light guide plate 123 by forming the side walls 131 of the guide panel 130 having a double structure. Thus, the optical gap A of FIG. 4A between the light guide plate 123 and the LED assembly 129 can be uniformly maintained.

Accordingly, the brightness and the image quality of the LCD device are prevented from being lowered due to the movement of the light guide plate 123, and the LEDs 129a of the LED assembly 129 are prevented from being damaged. Moreover, the light leakage due to additional elements for preventing movement of the light guide plate 123 can be prevented.

Figure 3A:
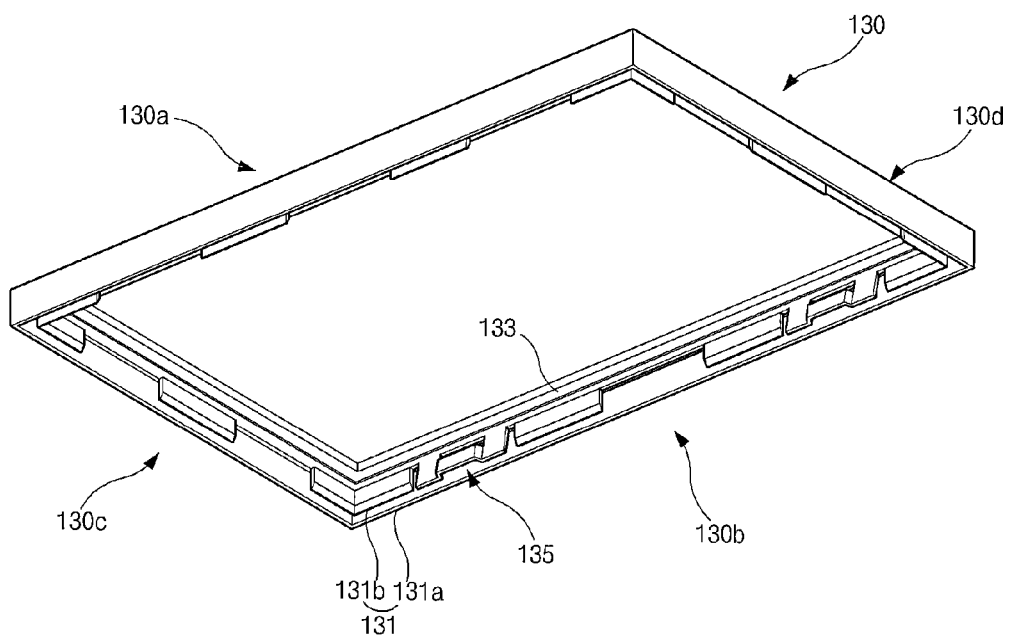
FIG. 3A is a perspective view of a guide panel of an embodiment of the present invention.
Figure 3B:
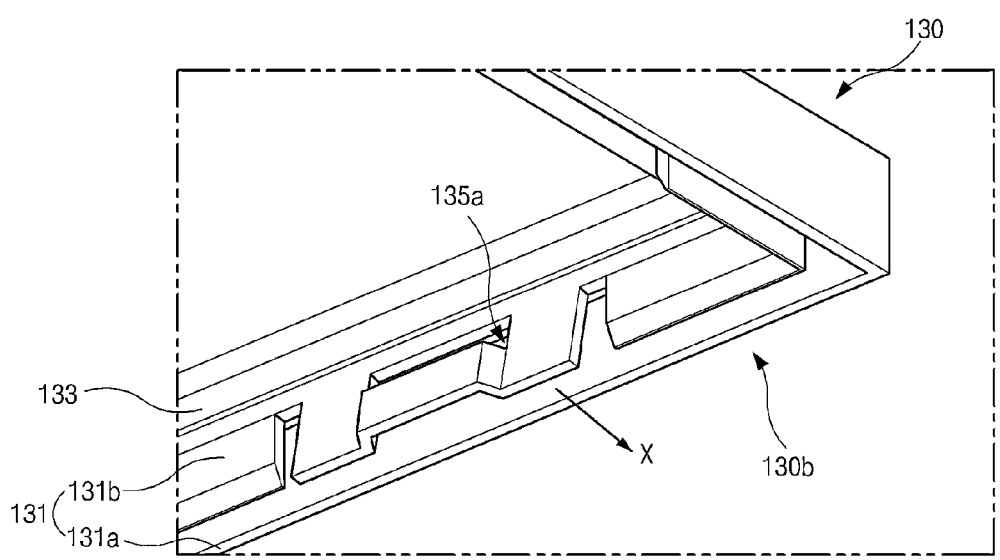
FIGS. 3B to 3D are views enlarging a part of the guide panel of FIG. 3A.
Figure 3C:
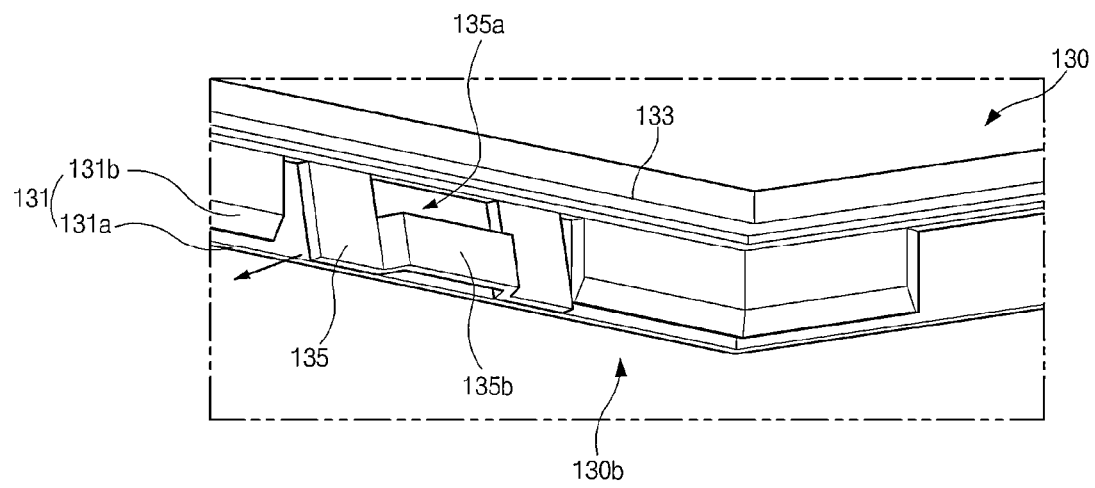
Figure 3D:
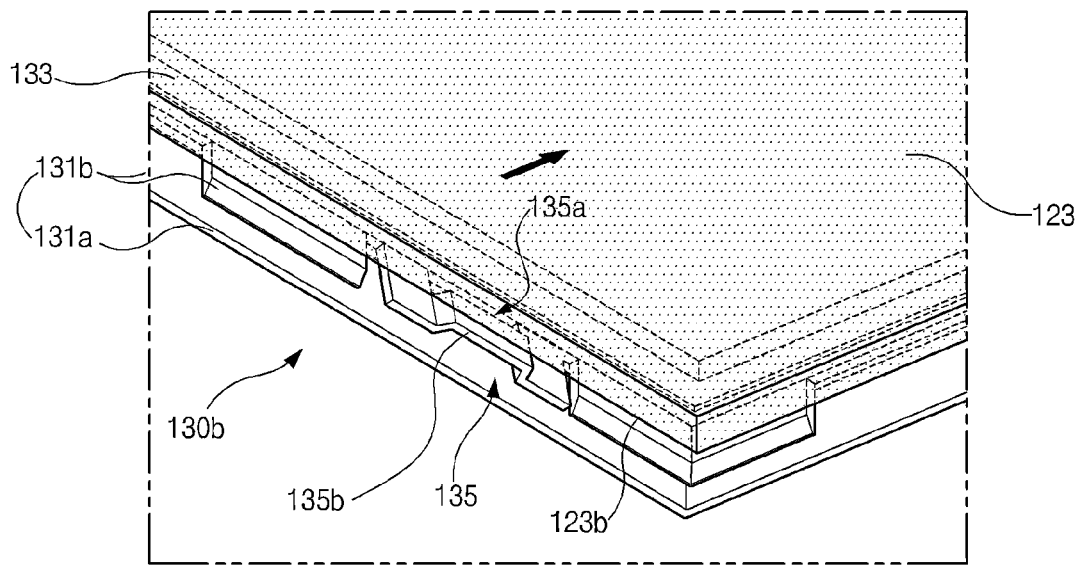

FIG. 3A is a perspective view of schematically illustrating a guide panel of an embodiment of the present invention, and FIGS. 3B to 3D are views of enlarging a part of the guide panel of FIG. 3A.

In FIGS. 3A to 3D, the guide panel 130, which surround edges of the backlight unit 120 of FIG. 2, is formed of a mold substance of a synthetic resin such as polycarbonate. The guide panel 130 includes side walls 131 and horizontal portions 133. The side walls 131 surround the edges of the backlight unit 120 of FIG. 2. The horizontal portions 133 extend from the inner surface of the side walls 131, and the liquid crystal panel 110 of FIG. 2 is disposed on the horizontal portions 133.

At this time, the side walls 131 of the guide panel 130 have a double structure. An elastic stopper 135 is formed at an edge of one side wall 131 covering an opposite light-incident surface 123b of the light guide plate 123 of FIG. 2, which is opposite to the light-incident surface 123a.

More particularly, the guide panel 130 has a rectangular frame shape and is formed by an injection molding method using a synthetic resin. The guide panel 130 includes a first part 130a, a second part 130b, a third part 130c and a fourth part 130d. The LED assembly 129 of FIG. 2 is arranged on the first part 130a. The second part 130b is disposed opposite to the first part 130a. The third and fourth parts 130c and 130d connect the first and second parts 130a and 130b. Each of the first, second, third and fourth parts 130a, 130b, 130c and 130d includes the side walls 131 surrounding the edges of the backlight unit 120 of FIG. 2 and the horizontal portions 133 being perpendicular to the side walls 131 and separating the backlight unit 120 of FIG. 2 and the liquid crystal panel 110 of FIG. 2.

At this time, the liquid crystal panel 110 of FIG. 2 is disposed on and supported by the horizontal portions 133.

Here, each of the side walls 131 may include a first vertical portion 131a and a second vertical portion 131b. The first vertical portion 131a is vertically bent from an end of the horizontal portion 133, and the second vertical portion 131b is formed under the horizontal portion 133 and is spaced apart from and faces the first vertical portion 131a.

Therefore, a part of the guide panel 130 may have a U-like shape in a cross-section due to the first and second vertical portions 131a and 131b and the horizontal portions 133.

At this time, the first and second vertical portions 131a and 131b are spaced apart from each other, and the sides 153 of the cover bottom 150 of FIG. 2 are inserted into spaces between the first and second vertical portions 131a and 131b. The liquid crystal panel 110 of FIG. 2 is disposed on the horizontal portions 133. Four edges of the rear surface of the liquid crystal panel 110 of FIG. 2 are disposed on and supported by the horizontal portions 133, thereby being fixed.

Here, since the part of the side walls 131 of the guide panel includes a double structure of the first and second vertical portions 131a and 131b, the strength of the guide panel 130 is increased. Thus, when the liquid crystal panel 110 is disposed on the horizontal portions 133 of the guide panel 130, the guide panel 130 is prevented from hanging down due to the weight of the liquid crystal panel 110.

At this time, at least two elastic stoppers 135 are formed at the side wall 131 of the second part 130b of the guide panel 130, which is opposite to the first part 130a corresponding to the LED assembly 129 of FIG. 2, along a length direction of the second part 130b.

Namely, the side wall 131 of the second part 130b has an area where the second vertical portion 131b is not formed, and the elastic stopper 135 is formed in the area as shown in FIG. 3B and FIG. 3C.

Here, the elastic stopper 135 is formed under the horizontal portion 133 and extends from the horizontal portion 133 to be inclined by a predetermined angle from a normal line perpendicular to the horizontal portion 133 toward an opposite side to the first vertical portion 131a. A hole 135a is formed at the elastic stopper 135 corresponding to a connection point with the horizontal portion 133. A step portion 135b is formed under the hole 135a and protrudes toward an opposite direction to the first vertical portion 131a. The step portion 135b faces the opposite light-incident surface 123b.

The elastic stopper 135 is formed at the second part 130b of the guide panel 130 and faces the opposite light-incident surface 123b of the light guide plate 123. Since the elastic stopper 135 formed at the second part 130b of the guide panel 130 is inclined with a predetermined angle from a normal line to the horizontal portion 133 to the opposite direction to the first vertical portion 131a, the elastic stopper 135 contacts the opposite light-incident surface 123b of the light guide plate 123 as shown in FIG. 3D and applies certain force to the light guide plate 123.

Accordingly, the optical gap A between the LED assembly 129 of FIG. 2 and the light-incident surface 123a of FIG. 2 of the light guide plate 123, referring to FIG. 4A, is uniformly maintained by the elastic stopper 135.

In addition, the elastic stopper 135 has elastic restoring force like a spring along an X-axis direction defined in FIG. 3B.

Therefore, even though vibrations and impacts from the outside are applied to the modularized LCD device and the light guide plate 123 moves, the optical gap A of FIG. 4A between the LED assembly 129 of FIG. 2 and the light-incident surface 123a of FIG. 2 of the light guide plate 123 is uniformly maintained because the light guide plate 123 goes back to its original position at once due to the elastic restoring force of the elastic stopper 135.

Moreover, the light guide plate 123 may be disposed under high temperatures for a long time owing to driving of the backlight unit 120 of FIG. 2 and driving of the liquid crystal panel 110 of FIG. 2, and the light guide plate 123 may be expanded. At this time, however, since the elastic stopper 135 applies certain force to the light guide plate 123, and an amount of expansion of the light guide plate 123 is decreased.

Furthermore, even though the light guide plate 123 is expanded, an amount of expansion of the light guide plate 123 is enabled to be absorbed by the elastic restoring force of the elastic stopper 135, and the movement of the light guide plate 123 is prevented.

Additionally, since the elastic stopper 135 has movements in a certain range due to its elastic restoring force, vibrations and impacts applied to the light guide plate 123 are absorbed by the movements, and the light guide plate 123 is prevented from being destroyed.

Moreover, although the light guide plate 123 is contracted due to its material property, certain force can be applied to the light guide plate 123 through the elastic stopper 135, and thus the optical gap A of FIG. 4A between the LED assembly 129 of FIG. 2 and the light-incident surface 123a of the light guide plate 123 can be uniformly maintained.

Furthermore, by applying certain force to the light guide plate 123 through the elastic stopper 135 formed at the guide panel 130, the light guide plate 123 is prevented from being moved. Thus, it is not necessary to form additional elements for preventing movement of the light guide plate 123, and occurrence of the light leakage due to the additional elements can be prevented.

From this, improvement in the brightness and the image quality increases the qualities of the LCD device.

In the meantime, a part of the side walls 131 of the guide panel 130 of the prevent invention has a double structure of first and second vertical portions 131a and 131b. When the light guide plate 123 is expanded more than the elastic restoring force of the elastic stopper 135, the force applied to the elastic stopper 135 can be dispersed by the second vertical portion 131b. Thus, the light guide plate 123 is more stably prevented from being moved and damaged, and the optical gap A of FIG. 4A between the LED assembly 129 of FIG. 2 and the light-incident surface 123a of FIG. 2 of the light guide plate 123 is uniformly maintained.

At this time, the elastic stopper 135 has a hole 135a around a connection point with the horizontal portion 133. Therefore, movement of the elastic stopper 135 is improved, and the elastic restoring force of the elastic stopper 135 is increased.

Here, if the hole 135a is not formed at the elastic stopper 135, when impacts from the outside are applied to the elastic stopper 135, the impacts are not applied to the only elastic stopper 135 but are applied to the whole guide panel 130 because the elastic restoring force of the elastic stopper is low.

Accordingly, this causes movement of the guide panel 130 itself. As a result, the light guide plate 123 also moves due to the movement of the guide panel 130. Therefore, the LEDs 129a of FIG. 2 of the LED assembly 129 of FIG. 2 may be damaged, or optical properties of the LCD device may be changed, thereby causing problems of lowering image qualities. It is therefore very effective to configure the hole 135a of the present embodiment for obviating such problems.

Additionally, in the elastic stopper 135 of the present invention, by forming the step portion 135b under the hole 135a, more force can be applied to the light guide plate 123.

Thus, even though the elastic restoring force of the elastic stopper 135 is low, the force applied to the light guide plate 123 increases due to the step portion 135b formed at a side of the elastic stopper 135. The movement of the light guide plate 123 can be stably prevented, and the optical gap A of FIG. 4A between the LED assembly 129 of FIG. 2 and the light-incident surface 123a of FIG. 2 of the light guide plate 123 can be uniformly maintained.

Figure 4B:
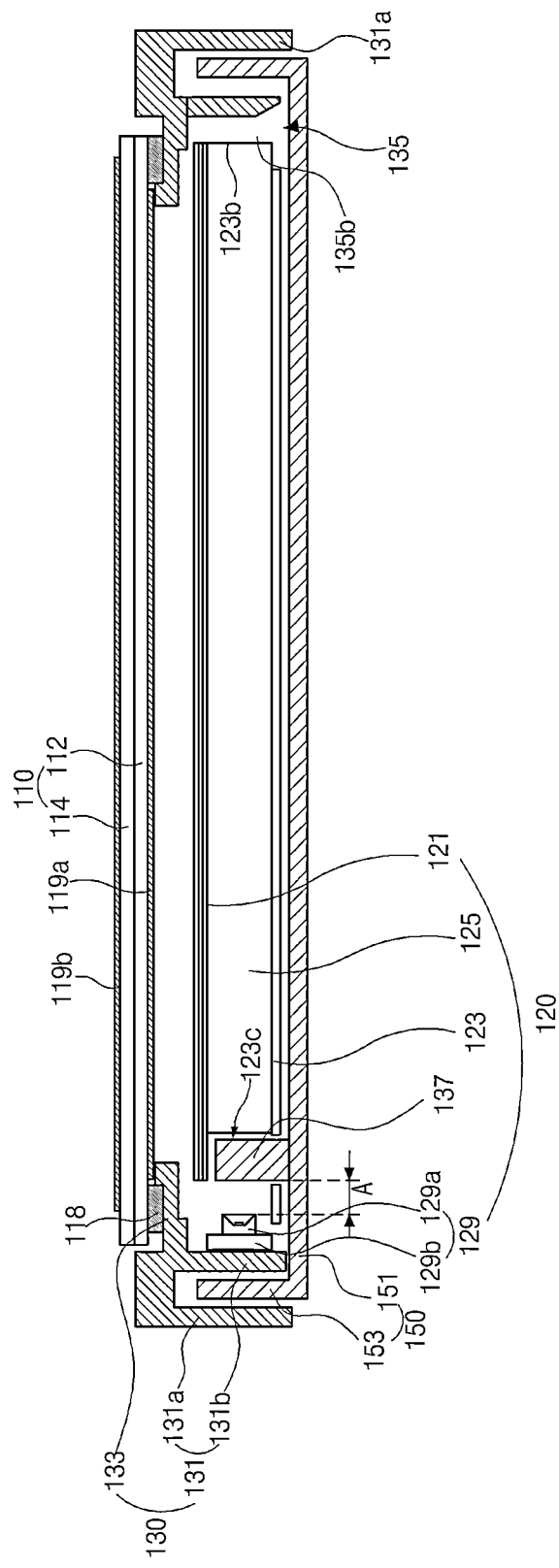
FIG. 4B is a cross-sectional view of a modularized LCD device of FIG. 2 taken along the line IV-IV' of FIG. 4A.

FIG. 4A is a plan view of a guide panel and a light guide plate according to an embodiment of the present invention, and FIG. 4B is a cross-sectional view of a modularized LCD device of FIG. 2 taken along the line IV-IV' of FIG. 4A.

In FIG. 4A and FIG. 4B, the guide panel 130 has a rectangular frame shape and includes side walls 131 surrounding the side surfaces of the backlight unit 120 of FIG. 2 and horizontal portions 133 vertically protruding from the side walls 131.

At this time, the side walls 131 partly have a double structure of first and second vertical portions 131a and 131b. An elastic stopper 135 is formed at a side covering the opposite light-incident surface 123b of the light guide plate 123 of the backlight unit 120 of FIG. 2.

The light guide plate 123 is disposed inside the guide panel 130, and the LED assembly 129 is arranged along a side of the guide panel 130 corresponding to the light-incident surface 123a of the light guide plate 123.

At this time, guide grooves 123c are formed at both sides of the light-incident surface 123a of the light guide plate 123 by removing corners of the light guide plate 123. Stoppers 137 are formed to correspond to the guide grooves 123c and disposed at both sides perpendicular to a side of the guide panel 130.

Therefore, the light guide plate 123 is prevented from being moved along −X-axis direction defined in the figure due to the elastic stopper 135, and the light guide plate 123 is prevented from being moved along +X-axis direction due to the stopper 137. Accordingly, the optical gap A between the light guide plate 123 and the LED assembly 129 is uniformly maintained.

In addition, even though vibrations and impacts from the outside are applied to the modularized LCD device and the light guide plate 123 moves, the optical gap A between the LED assembly 129 and the light-incident surface 123a of the light guide plate 123 is uniformly maintained because the light guide plate 123 goes back to its original position at once due to the elastic restoring force of the elastic stopper 135.

Moreover, since the elastic stopper 135 applies certain force to the light guide plate 123, and an amount of expansion of the light guide plate 123 is decreased. Although the light guide plate 123 is expanded, an amount of expansion of the light guide plate 123 is enabled to be absorbed by the elastic restoring force of the elastic stopper 135, and the movement of the light guide plate 123 is prevented.

Furthermore, vibrations and impacts are absorbed by the elastic stopper 135, and the light guide plate 123 is prevented from being destroyed. Although the light guide plate 123 is contracted due to its material property, certain force can be applied to the light guide plate 123, and thus the optical gap A between the LED assembly 129 and the light-incident surface 123a of the light guide plate 123 can be uniformly maintained.

Figure 5A:
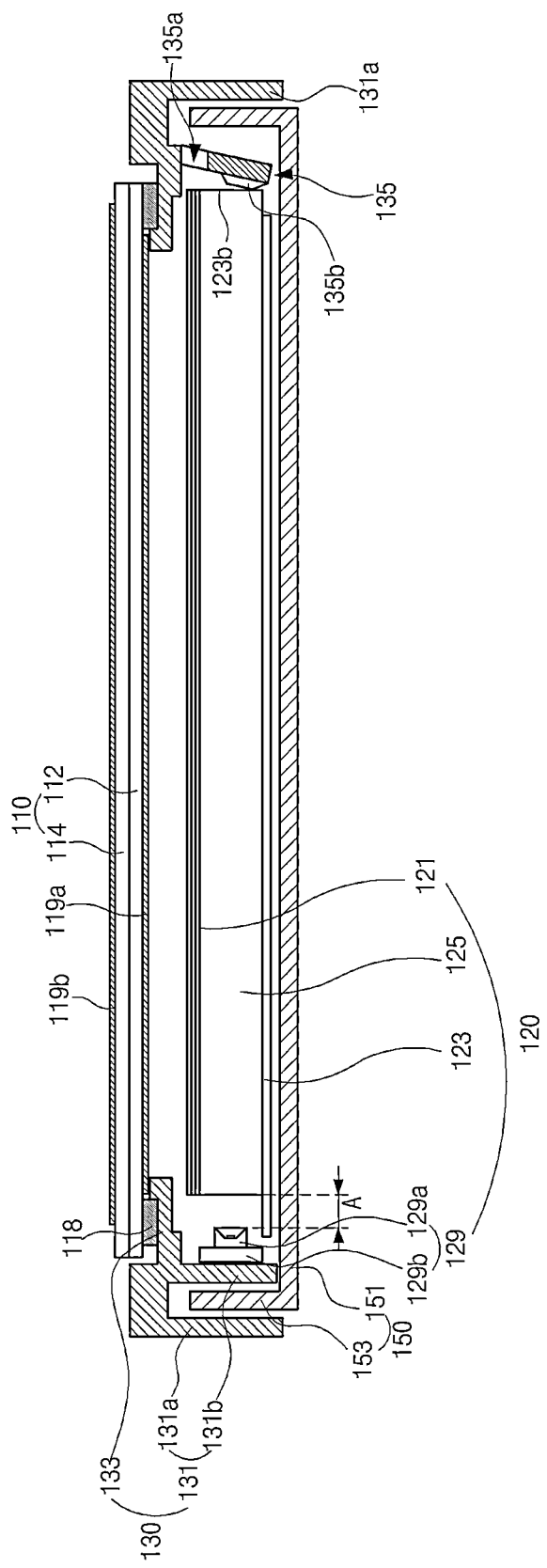
FIGS. 5A and 5B are cross-sectional views of a modularized LCD device of FIG. 2 taken along the line V-V' of FIG. 4A.
Figure 5B:
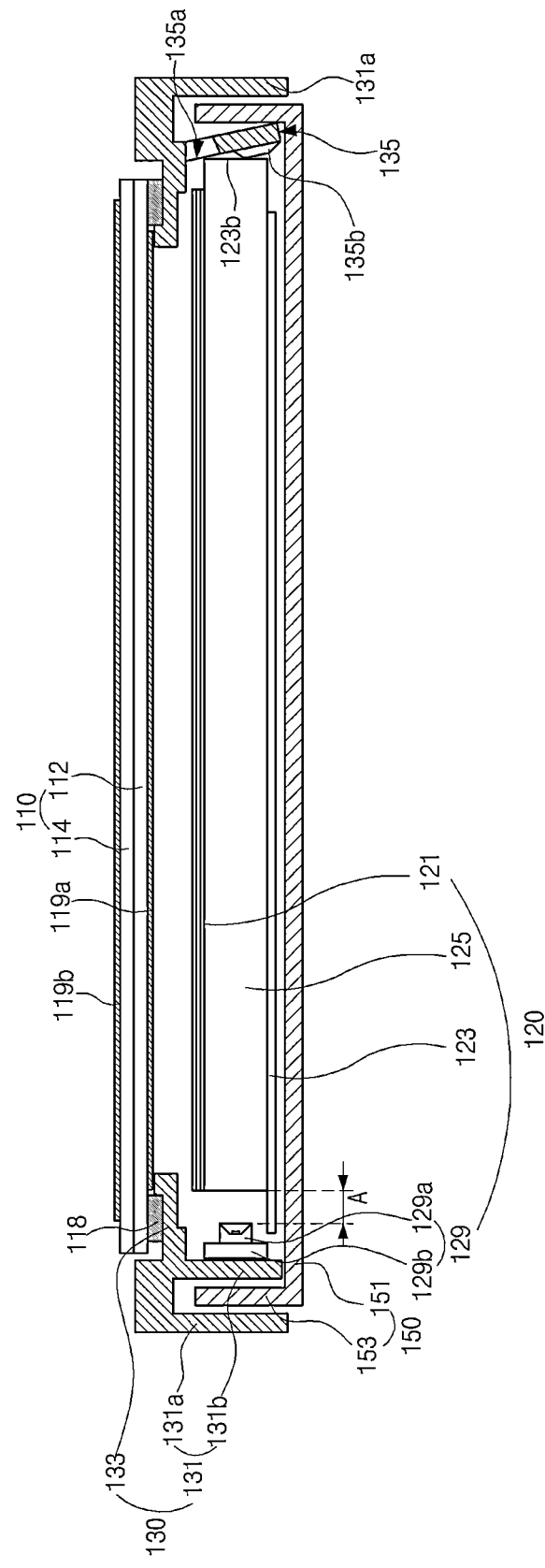

FIGS. 5A and 5B are cross-sectional views of a modularized LCD device of FIG. 2 taken along the line V-V' of FIG. 4A.

In FIGS. 5A and 5B, the backlight unit 120 includes the reflection sheet 125, the light guide plate 123, the LED assembly 129 comprised of the LEDs 129a and the PCB 129b on which the LEDs 129a are mounted, and the optical sheets 121 sequentially located over the light guide plate 123.

The liquid crystal panel 110 is disposed over the backlight unit 120 and includes the first and second substrates 112 and 114 and the liquid crystal layer (not shown) between the first and second substrates 112 and 114. The polarizers 119a and 119b are attached at outer surfaces of the first and second substrates 112 and 114 and selectively transmit specific light.

Here, edges of the backlight unit 120 are surrounded by the guide panel 130, and the cover bottom 150 is disposed at the rear surface of the backlight unit 120 and is combined with the guide panel 130.

The guide panel 130 includes the side walls 131 and the horizontal portions 133. The side walls 131 surround the side surfaces of the backlight unit 120. The horizontal portions 133 protrude inwards from the side walls 131 and cover an upper portion of the LED assembly 129 and upper edges of the light guide plate 123.

At this time, the side walls 131 of the guide panel 130 have a double structure, and each of the side walls 131 includes the first vertical portion 131a and the second vertical portion 131b. The first vertical portion 131a is vertically bent from the end of the horizontal portion 133. The second vertical portion 131b is formed under the horizontal portion 133, and is spaced apart from and faces the first vertical portion 131a.

Therefore, a part of the guide panel 130 may have a U-like shape in a cross-section due to the first and second vertical portions 131a and 131b and the horizontal portions 133. The sides 153 of the cover bottom 150 are inserted into the spaces between the first and second vertical portions 131a and 131b.

Four edges of the rear surface of the liquid crystal panel 110 are disposed on and supported by the horizontal portions 133. The adhesive pad 118 is used to fix the liquid crystal panel 110.

The adhesive pad 118, which is formed of an adhesive material such as a double-sided tape, fixes the liquid crystal panel 110 on the horizontal portions 133.

At this time, the elastic stopper 135 is formed at the guide panel 130 facing the opposite light-incident surface 123b, which is opposite to the light-incident surface 123a of the light guide plate 123. The elastic stopper 135 is formed under the horizontal portion 133 and extends from the horizontal portion 133 to be inclined by a predetermined angle from a normal line perpendicular to the horizontal portion 133 toward an opposite side to the first vertical portion 131a.

In addition, the hole 135a is formed at the elastic stopper 135 around a connection point with the horizontal portion 133. The step portion 135b is formed under the hole 135a and protrudes toward an opposite direction to the first vertical portion 131a.

The elastic stopper 135 contacts the opposite light-incident surface 123b of the light guide plate 123, and as shown in FIG. 5A, the elastic stopper 135 applies certain force to the light guide plate 123 toward the LED assembly 129.

Therefore, in the LCD device of the present invention, the optical gap A between the LED assembly 129 and the light guide plate 123 for providing the surface light source of a high quality to the liquid crystal panel 110, as an important role of the backlight unit 120, is uniformly maintained by the elastic stopper 135.

At this time, when impacts from the outside are applied to the modularized LCD device, the elastic stopper 135 moves within a predetermined range, as shown in FIG. 5B, due to the elastic restoring force of the elastic stopper 135, and the vibrations and impacts are absorbed by the movement of the elastic stopper 135. Accordingly, the light guide plate 123 is prevented from being damaged.

In addition, even though the light guide plate 123 moves, the light guide plate 123 goes back to its original position at once due to the elastic restoring force of the elastic stopper 135, and the optical gap A between the LED assembly 129 and the light incident surface 123a of the light guide plate 123 is uniformly maintained.

Moreover, although the light guide plate 123 is contracted due to its material property, the optical gap A between LED assembly 129 and the light-incident surface 123a of the light guide plate 123 is uniformly maintained by applying certain force to the light guide plate 123 through the elastic stopper 135.

Furthermore, when the light guide plate 123 is expanded, the amount of expansion of the light guide plate 123 is absorbed by the elastic restoring force of the elastic stopper 135, and thus movement of the guide panel 130 is prevented.

For example, when the coefficient of linear expansion of the light guide plate 123 is 6.5E-5/° C., the light guide plate 123 may be expanded by about 0.7 mm under temperature of 60 degrees of Celsius. At this time, to form a narrow bezel, when the total gap between the light guide plate 123 and the guide panel 130 is 0.2 mm, there may be an overlap of 0.5 mm between the light guide plate 123 and the guide panel 130.

The overlap causes movement of the guide panel 130.

To prevent the movement of the guide panel 130, the total gap between the light guide plate 123 and the guide panel 130 may be 0.7 mm by considering the overlap resulting from the expansion of the light guide plate 123, and in this case, it is difficult to form a narrow bezel.

However, in the present invention, even though the light guide plate 123 is expanded, the expansion of the light guide plate 123 is absorbed by the elastic restoring force of the elastic stopper 135, and the movement of the guide panel 130 is prevented.

Accordingly, it is not needed to determine the total gap between the light guide plate 123 and the guide panel 130 considering the overlap due to the expansion of the light guide plate 123 such that the guide panel 130 is prevented from moving. Thus, the narrow bezel can be formed.

Particularly, in the guide panel 130 according to the embodiment of the present invention, the hole 135a is formed at the elastic stopper 135, and the movement of the elastic stopper 135 is improved. Therefore, the elastic restoring force of the elastic stopper is further increased.

Here, if the hole 135a is not formed at the elastic stopper 135, when impacts from the outside are applied to the elastic stopper 135, the impacts are not applied to the only elastic stopper 135 but are applied to the whole guide panel 130 because the elastic restoring force of the elastic stopper is low.

Figure 6A:
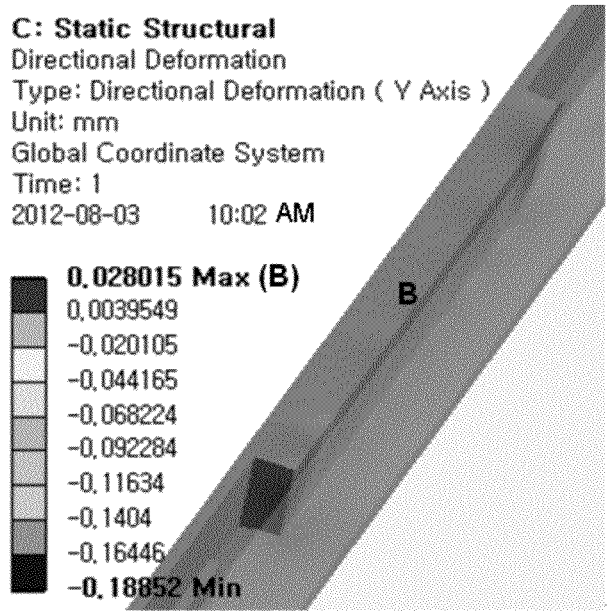
FIG. 6A and FIG. 6B are simulation results of measuring an amount of deformation of a guide panel depending on an elastic stopper with or without a hole according to the embodiment of the present invention.
Figure 6B:
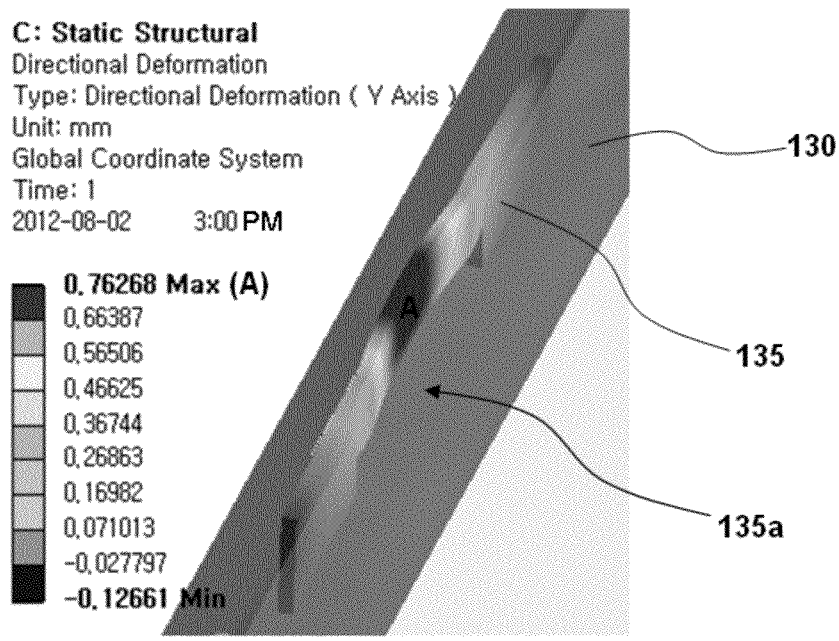
Figure 6C:
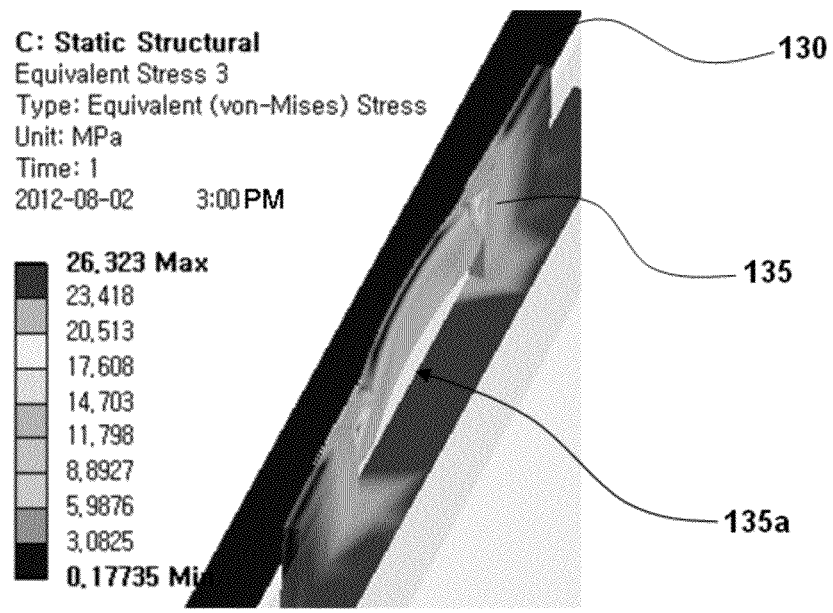
FIG. 6C is a simulation result of measuring tensile strength of an elastic stopper.

FIG. 6A and FIG. 6B are simulation results of measuring an amount of deformation of a guide panel depending on an elastic stopper with or without a hole according to the embodiment of the present invention, and FIG. 6C is a simulation result of measuring tensile strength of an elastic stopper.

As shown in FIG. 6A, when the hole is not formed at the elastic stopper 135, the amount of deformation of the guide panel 130 is 0.02 mm.

On the contrary, as shown in FIG. 6B, the embodiment of the present invention comprises the elastic stopper 135 having the hole 135a, the possible movement due to its elastic restoring force is increased to 0.7 to 0.8 mm.

Therefore, even though the light guide plate 123 having the coefficient of linear expansion of 6.5E-5/° C. is expanded by about 0.7 mm under temperature of 60 degrees of Celsius, all the expansion of the light guide plate 123 of FIG. 5B is absorbed by the elastic stopper 135, and the guide panel 130 is prevented from being moved by the expansion of the light guide plate 123 of FIG. 5B. Accordingly, the total gap between the light guide plate 123 and the guide panel 130 can be 0.2 mm, and thus the narrow bezel can be formed.

Moreover, FIG. 6C is a simulation result of measuring tensile strength of an elastic stopper when the light guide plate slow pushes the guide panel, and as shown in FIG. 6C, even though the elastic stopper 135 according to the embodiment of the present invention has the possible movement of 0.7 to 0.8 mm due to its elastic restoring force, the maximum tensile strength applied to the elastic stopper 135 due to the movement of the light guide plate 123 is 26.6 MPa, which is lower than 65 MPa, the tensile strength of the guide panel 130. Thus, the damage of the elastic stopper 135 is prevented.

FIGS. 7A to 7D are simulation results of measuring light leakage when an LCD device according to the present invention is driven under different temperatures.

Figure 7A:
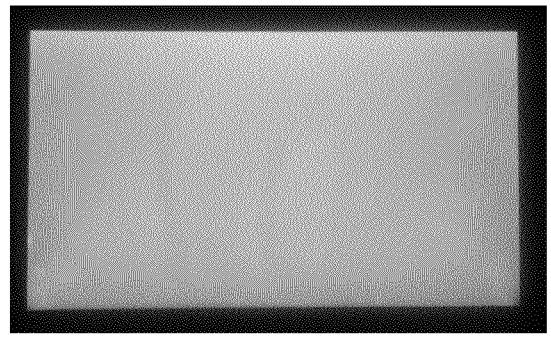
FIGS. 7A to 7D are simulation results of measuring light leakage when an LCD device according to the present invention is driven under different temperatures.
Figure 7B:
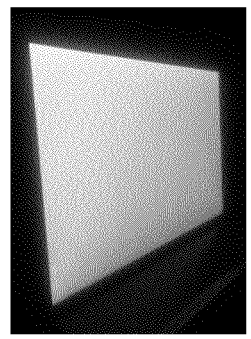
Figure 7C:
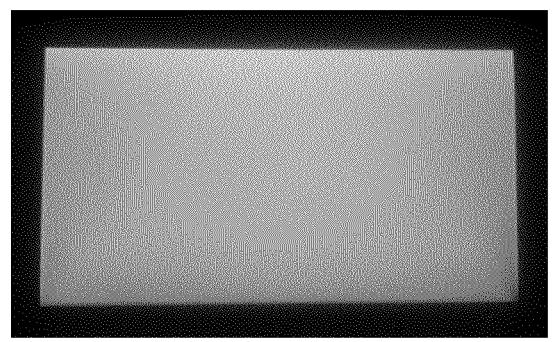
Figure 7D:
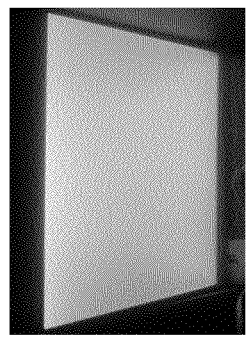

Here, FIGS. 7A and 7B are simulation results of measuring light leakage when the LCD device according to the embodiment of the present invention is driven under high temperature of 60 degrees of Celsius, and FIGS. 7C and 7D are simulation results of measuring light leakage when the LCD device according to the embodiment of the present invention is driven under low temperature of 0 degree of Celsius.

Referring to FIGS. 7A to 7D, the LCD device of the present invention has narrow bezels and does not include additional elements at the light guide plate 123 of FIG. 5B. Thus, even though the LCD device is driven under high or low temperature, there is no light leakage.

As stated above, in the LCD device of the present invention, the part of the side walls 131 of the guide panel 130 of FIG. 5B includes a double structure, and the strength of the guide panel 130 is increased. The elastic stopper 135 is formed at the side walls 131 of the guide panel 130 of FIG. 5B, and the optical gap A of FIG. 5B between the light guide plate 123 of FIG. 5B and the LED assembly 129 of FIG. 5B is uniformly maintained.

From this, the light guide plate 123 of FIG. 5B is prevented from being moved due to the movement of the guide panel 130, and the brightness and image qualities of the LCD device are improved.

In addition, since it is not necessary to form the additional elements at the light guide plate 123 of FIG. 5B, the light leakage due to the additional elements is prevented.

Moreover, the LEDs 129a of the LED assembly 129 of FIG. 5B are prevented from being damaged, and the image qualities are prevented from being lowered due to changes of the optical properties of the LCD device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a liquid crystal panel;
   a backlight unit disposed at a rear side of the liquid crystal panel;
   a cover bottom in which the backlight unit is disposed; and
   a guide panel;
   wherein the backlight unit further comprises:
      an LED assembly; and
      a light guide plate having a first surface and a second surface opposite to the first surface, wherein the first surface faces the LED assembly;

wherein the cover bottom further includes:
  a horizontal plane; and
  a side plane perpendicular to the horizontal plane,
    wherein the backlight unit is disposed over the horizontal plane,
wherein the guide panel further includes:
  a side wall having a first vertical portion; and
  a horizontal portion being vertically bent from the first vertical portion,
    wherein the first vertical portion is configured to surround an outer surface of the side plane of the cover bottom,
    wherein the horizontal portion is configured to support the liquid crystal panel,
wherein at least one elastic stopper is formed at the side wall of the guide panel and contacts the second surface of the light guide plate, the elastic stopper including a connection point where the elastic stopper is connected to the horizontal portion of the guide panel and the elastic stopper further includes a hole formed in a portion of the connection point,
wherein part of the side wall includes a second vertical portion, which is spaced apart from the first vertical portion and surrounds an edge of the backlight unit, and has a double structure, and
wherein the LED assembly is disposed directly on an inner surface of the second vertical portion.

2. The device according to claim 1, wherein the elastic stopper is formed under the horizontal portion and extends from the horizontal portion to be inclined by a predetermined angle from a normal line perpendicularly to the horizontal portion toward an opposite side to the first vertical portion.

3. The device according to claim 1, wherein the elastic stopper includes a step portion protruding toward the second surface of the light guide plate.

4. The device according to claim 1, wherein at least two elastic stoppers are formed along a length direction of the side wall of the guide panel.

5. The device according to claim 1, wherein stoppers are disposed on the horizontal plane and spaced apart from each other along a first direction, the stoppers are disposed between the light guide plate and the LED assembly along a second direction crossing the first direction, and a portion of the light guide plate including the first surface is disposed between the stoppers to maintain an optical gap between the first surface of the light guide plate and the LED assembly.

6. The device according to claim 5, wherein guide grooves are formed at both ends of the first surface of the light guide plate, and the stoppers are inserted into the guide grooves.

7. The device according to claim 1, wherein the liquid crystal display device lacks a top cover over the liquid crystal panel.

8. A liquid crystal display device, comprising:
  a liquid crystal panel;
  a backlight unit disposed at a rear side of the liquid crystal panel;
  a cover bottom in which the backlight unit is disposed; and
  a guide panel;
  wherein the backlight unit further comprises:
    an LED assembly; and
    a light guide plate having a first surface and a second surface opposite to the first surface, wherein the first surface faces the LED assembly;
wherein the cover bottom further includes:
  a horizontal plane; and
  a side plane perpendicular to the horizontal plane,
    wherein the backlight unit is disposed over the horizontal plane,
wherein the guide panel further includes:
  a side wall having a first vertical portion; and
  a horizontal portion being vertically bent from the first vertical portion,
    wherein the first vertical portion is configured to surround an outer surface of the side plane of the cover bottom,
    wherein the horizontal portion is configured to support the liquid crystal panel,
wherein at least one elastic stopper contacts the second surface of the light guide plate and is formed at the side wall of the guide panel under the horizontal portion of the guide panel,
wherein the elastic stopper includes a first portion and a second portion that extend from the horizontal portion of the guide panel in a first direction and the elastic stopper further includes a step portion formed between the first portion and the second portion in a second direction perpendicular to the first direction and the elastic stopper further includes a hole formed between the step portion and the horizontal portion of the guide panel, the step portion protruding from the first portion and the second portion of the elastic stopper;
wherein part of the side wall includes a second vertical portion, which is spaced apart from the first vertical portion and surrounds an edge of the backlight unit, and has a double structure, and
wherein the LED assembly is disposed directly on an inner surface of the second vertical portion.

9. The device according to claim 8, wherein the first portion and the second portion of the elastic stopper are inclined by a predetermined angle from a normal line perpendicularly to the horizontal portion toward an opposite side to the first vertical portion.

10. The device according to claim 8, wherein at least two elastic stoppers are formed along a length direction of the side wall of the guide panel.

11. The device according to claim 8, wherein stoppers are disposed on the horizontal plane and spaced apart from each other along a first direction, the stoppers are disposed between the light guide plate and the LED assembly along a second direction crossing the first direction, and a portion of the light guide plate including the first surface is disposed between the stoppers to maintain an optical gap between the first surface of the light guide plate and the LED assembly.

12. The device according to claim 11, wherein guide grooves are formed at both ends of the first surface of the light guide plate, and the stoppers are inserted into the guide grooves.

13. The device according to claim 8, wherein the liquid crystal display device lacks a top cover over the liquid crystal panel.

* * * * *